United States Patent [19]
Zillner

[11] 3,828,623
[45] Aug. 13, 1974

[54] REMOTE OUTSIDE REARVIEW MIRROR

[75] Inventor: Gunter Zillner, Fliesteden/Bergheim, Germany

[73] Assignee: Ford Motor Company, Dearborn, Mich.

[22] Filed: Feb. 12, 1973

[21] Appl. No.: 331,924

[30] Foreign Application Priority Data
July 12, 1972 Germany............................ 2234191

[52] U.S. Cl. ................................ 74/491, 74/501 M
[51] Int. Cl.............................................. G05g 1/00
[58] Field of Search ........................... 74/491, 50 M

[56] References Cited
UNITED STATES PATENTS
3,589,208  6/1971  Brero ................................. 74/491
3,592,074  7/1971  Petersen .............................. 74/491
3,659,477  5/1972  Wehner............................ 74/501 M Primary Examiner—Samuel Scott
Assistant Examiner—Wesley S. Ratliff, Jr.
Attorney, Agent, or Firm—K. L. Zerschling; J. J. Roethel

[57] ABSTRACT

A remote-adjustable outside rearview mirror for motor vehicles having an adjuster mechanism arranged in the mirror housing operable through a rotatable, flexible drive shaft, from the vehicle interior.

7 Claims, 3 Drawing Figures

3,828,623

REMOTE OUTSIDE REARVIEW MIRROR

BACKGROUND OF THE INVENTION

German Gebrauchsmuster 7,139,343 discloses an external rearview mirror in which the mirror housing surrounding the mirror proper is separate from the mirror base and is articulated to the base through a ball joint. An eccentric rotatably assembled in the mirror base and cooperating with the mirror housing inside the base does duty as an adjusting mechanism which can be operated from the vehicle interior through the medium of a rotatable, flexible, operating shaft.

This adjuster mechanism has the drawback that it can only produce a simple tumbling motion on the part of the mirror so that a ray emanating from a point on the mirror at right angles to the mirror surface is simply moved along a specific circular path when the mirror is adjusted.

The object of the present invention is to create an external rearview mirror of the kind introductorily described, which while at the same time having the simplest possible construction and being simple to operate through a single, rotatable, flexible operating shaft, avoids this drawback and makes it possible to produce separate adjustment of the mirror about horizontal and vertical axes.

SUMMARY OF THE INVENTION

In accordance with the invention, this object is achieved in that the mirror housing surrounding the mirror proper is formed of an elastomeric material and is integral with the mirror base. The mirror proper is fixed to a flexible edge of the mirror housing and to a mounting plate. The mounting plate is supported on a fixed bearing or mounting in the mirror housing through the medium of two central, vertical pins, a slider ring and a swash plate secured to the operating shaft so that it cannot rotate relatively thereto. Through the swash plate the mounting plate is mounted for rotation and axial displacement. A lateral, vertical pin and a lever arm provide for pivotal movement about a vertical pivot axis.

The rotatably and axially displaceable swash plate is threadedly attached to the fixed bearing or mounting.

The lever arm engaging the lateral, vertical pin, has a limited universal degree of freedom.

The flexible edge of the mirror housing can be made more elastic by producing an annular fold therein.

By supporting the mirror proper on the fixed bearing or mounting, through the mounting plate, the two central, vertical pins, the slider ring, the rotatably and axially displaceable swash plate and the lateral, vertical pin and lever arm, as proposed in accordance with the invention, adjustment of the mirror about a horizontal axis is made possible by the tumble action of the swash plate and adjustment of the mirror about a vertical axis by axial movement of the swash plate. By means of the two central, vertical pins, through which the mounting plate is attached to the swash plate, the result is achieved that the tumble action suddenly produces a pivoting movement on the part of the mirror proper about a horizontal axis passing through the mirror center. By means of the lateral, vertical pin and lever arm, the result is achieved that the axial movement of the swash plate, through the agency of the threaded connection, results in a pivoting motion of the mirror about the vertical axis through the vertical pin.

BRIEF DESCRIPTION OF THE DRAWING

The invention will be explained in more detail making reference to an example illustrated in the attached drawings.

DESCRIPTION OF THE PREFERRED EMBODIMENT

Figure 1:
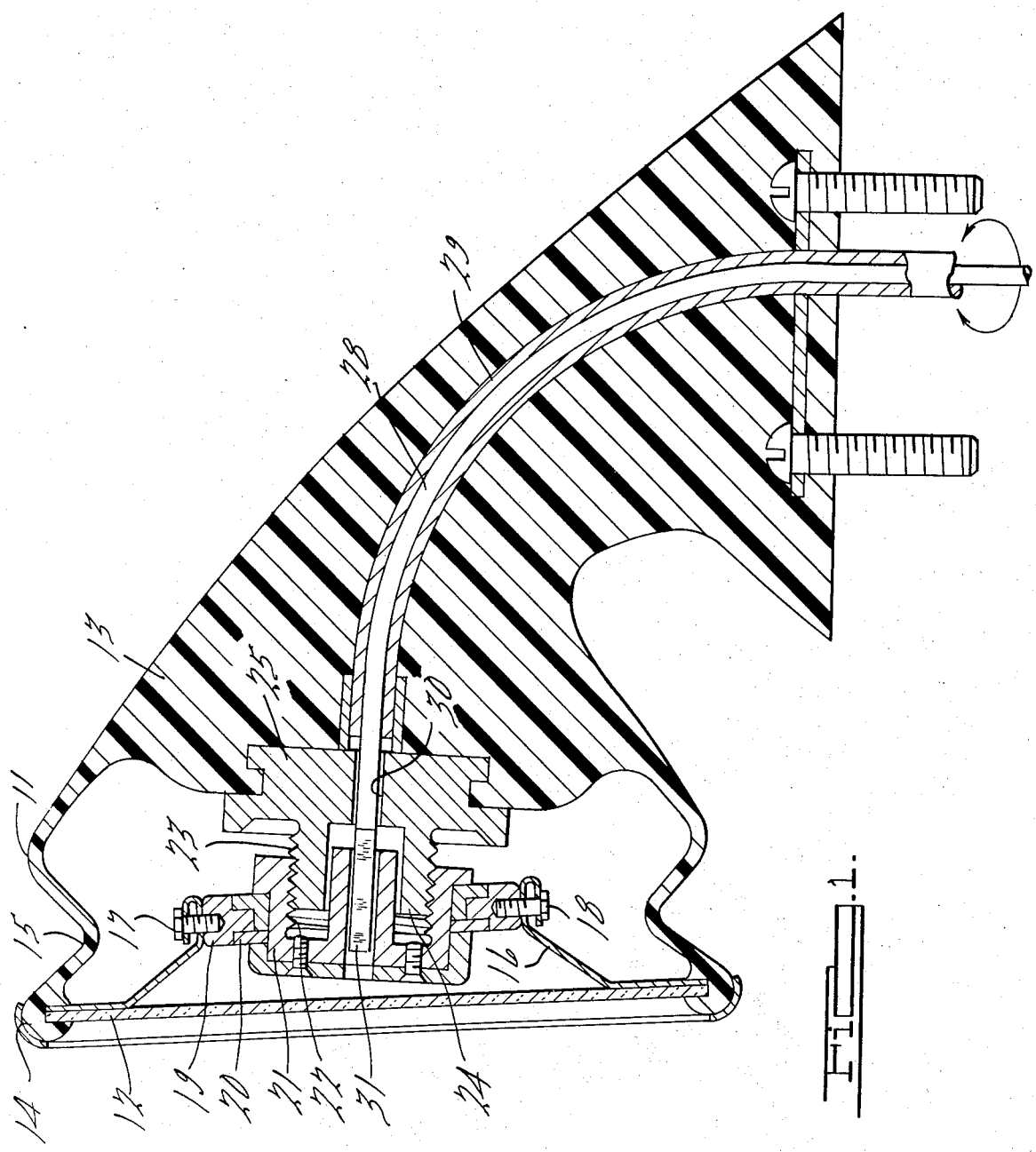
FIG. 1 illustrates a vertical section through an outside remote control rearview mirror in accordance with the invention.
Figure 2:
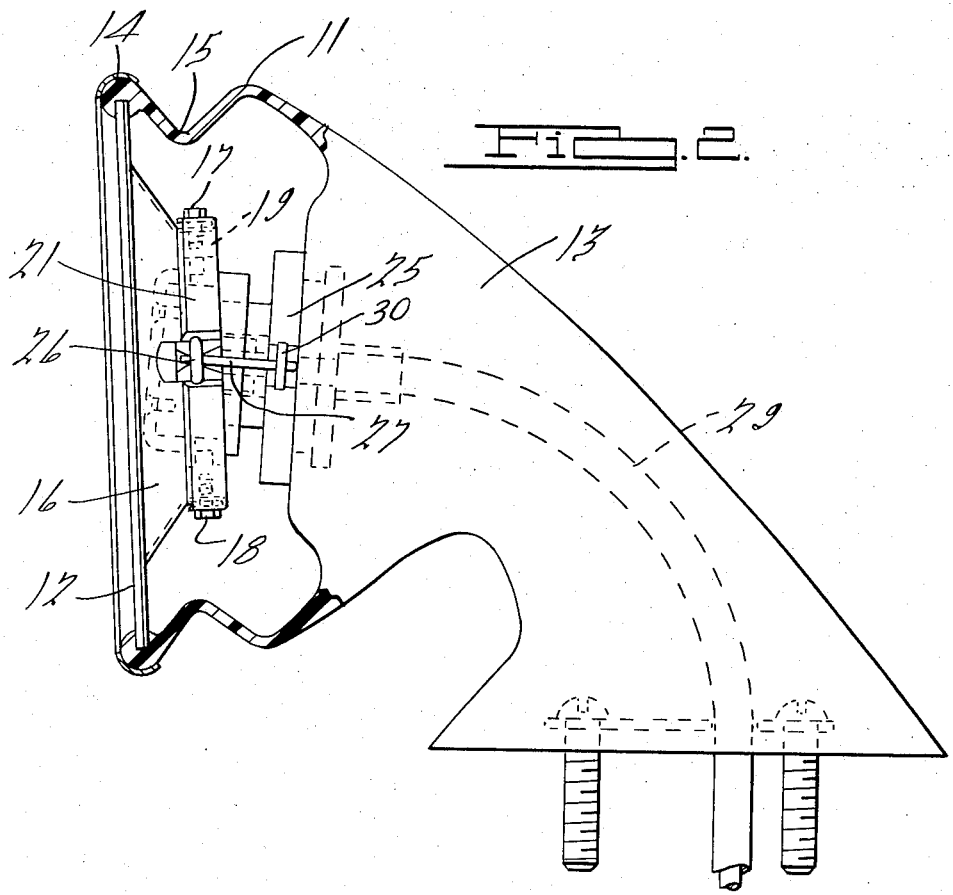
FIG. 2 illustrates a side elevation of the adjuster mechanism with the walls of the mirror housing partly cut away.
Figure 3:
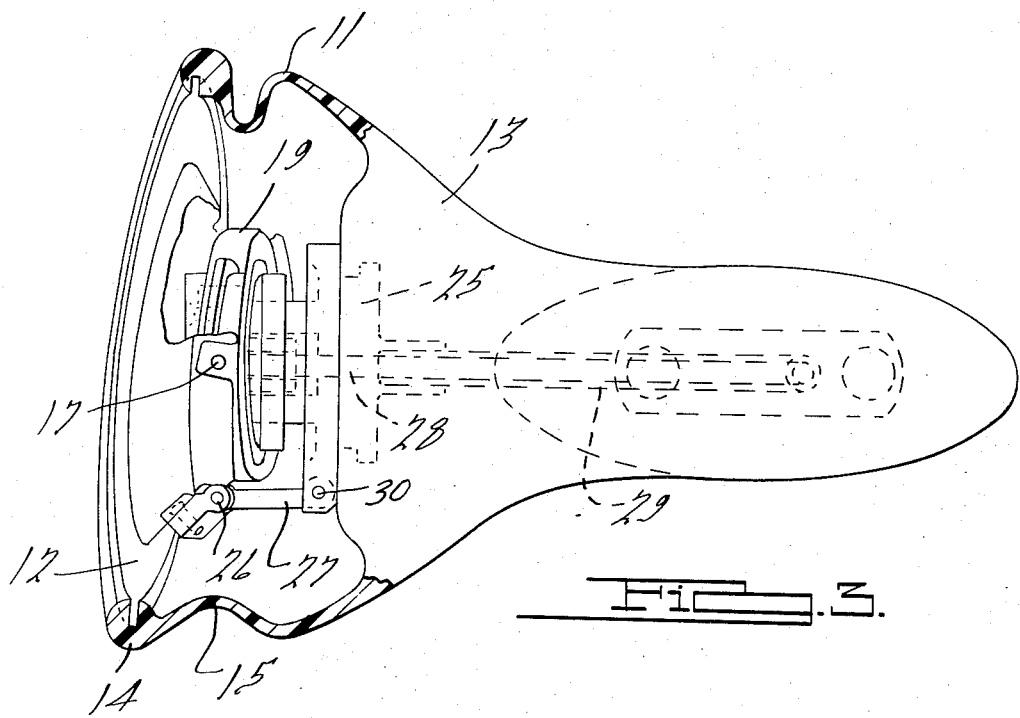
FIG. 3 illustrates a plan view of the adjuster mechanism with the walls of the mirror housing partly cut away.

In the drawings, the mirror housing 11 serving the mirror 12 proper is manufactured integrally with the mirror base 13 of an elastomeric material. The mirror 12 is arranged in fixed fashion in a flexible rim 14 of the mirror housing 11, and this rim can be made more elastic by providing the mirror housing with an annular fold 15.

The mirror 12 is attached at its rear to a mounting plate 16. The mounting plate 16 is in turn attached through two central, vertical pins 17, 18 to a slider ring 19 mounted in a bearing 20. The slider ring 19 transmits the tumble action of the swash plate 21 through the two pins 17 and 18, in the form of a pivoting motion about a horizontal axis, to the mirror.

The swash plate 21 is rotatably and axially displaceable due to the cooperation between its internal thread 22 with an external thread 23 on an extension 24 formed on a fixed bearing or mounting 25 secured in the mirror housing 11.

The mounting plate 16 is furthermore coupled through a third, lateral, vertical pin 26 carried on the mounting plate and a lever arm 27. The lever arm 27 extends from the pin 26 to a pivot pin 30 carried on the fixed bearing or mounting 25. The lever arm 27 has a limited degree of universal freedom on the pin 26. The lever arm 27, through the pin 26, locates the mounting plate 16 at a point so that an axial movement on the part of the swash plate 21 can be transmitted to the mirror 12 proper to produce a pivoting motion about a lateral, vertical axis.

A rotational movement of the swash plate 21 is produced through a flexible drive shaft 28 one of whose ends is located inside the vehicle and which can be operated by hand through the medium of a knob (not shown). The flexible drive shaft 28 passes through an outer tube 29 embedded in the mirror base 13 and enters the mirror housing 11 through a bore 30 in the mounting 25. This end of the drive shaft 28, for example, is secured against the rotation in the swash plate 21, by giving it a squared end 31, but is slidable axially therein.

Thus, by rotating the drive shaft 28, the swash plate 21 is rotated simultaneously and, because it is mounted upon a threaded connection 22–23, it moves axially at the same time. The tumble action of the swash plate produces displacement of the mirror proper about a horizontal axis while the simultaneous small axial movement which takes place produces adjustment of the mirror about a lateral, vertical axis. Thus, a specific inclination on the part of the mirror about the horizontal axis can be combined, in accordance with a number of thread pitches, with different inclinations of the mirror about the vertical axis. Displacement of the mirror from the outside, by the application of pressure or the like, is impossible here.

It is to be understood that the invention is not limited to the exact construction illustrated and described above, but that various changes and modifications may be made without departing from the spirit and scope of the invention as defined by the following claims.

I claim:

1. A remotely adjustable outside rearview mirror assembly for motor vehicles,
   the mirror assembly comprising a housing,
   a mirror peripherally surrounded by the housing,
   and an adjuster mechanism within the housing coupled to the mirror and operable from the vehicle interior through a rotatable flexible shaft,
   characterized in that:
   the mirror housing surrounding the mirror is formed integrally with a mirror assembly base of elastomeric material,
   the mirror housing has a flexible rim to which the mirror is fixed,
   a mounting plate is attached to the mirror within the housing,
   a fixed bearing is mounted on the housing,
   the mounting plate is supported on the bearing through the medium of two central, vertical pins carried on a slider ring journalled on a swash plate, a vertical pin laterally offset from the two central vertical pins is mounted on the mounting plate,
   a lever arm means articulated to the laterally mounted vertical pin extends to the fixed bearing, a coupling means journals the swash plate on the fixed bearing for rotational and axial movement thereon,
   and the rotatable flexible shaft is coupled to the swash plate to rotate the latter to cause the same to be displaced on the fixed bearing,
   the swash plate as it is rotated causing the slider ring to translate the tumble action of the swash plate through the two central, vertical pins into tilting movement of the mirror about a horizontal axis,
   the swash plate further upon being rotated causing the lever arm means to translate axial movement of the swash plate into pivotal movement of the mounting plate about the vertical axis defined by the two central, vertical pins.

2. An outside rearview mirror assembly as claimed in claim 1, characterized in that:
   the rotatable and axially displaceable swash plate is threadedly coupled to the fixed bearing.

3. An outside rearview mirror assembly as claimed in claim 2, characterized in that:
   the lever arm means articulated to the laterally mounted vertical pin has a limited universal degree of freedom.

4. An outside rearview mirror assembly as claimed in claim 3, characterized in that:
   the flexible rim of the mirror housing has increased elasticity through a flexible fold.

5. An outside rearview mirror assembly as claimed in claim 1, characterized in that:
   the lever arm means articulated to the lateral, vertical pin has a limited universal degree of freedom.

6. An outside rearview mirror assembly as claimed in claim 5, characterized in that:
   the flexible rim of the mirror housing has increased elasticity through a flexible fold.

7. An outside rearview mirror assembly as claimed in claim 1, characterized in that:
   the flexible rim of the mirror housing has increased elasticity through a flexible fold.

* * * * *